Aug. 11, 1942.  P. A. SUMNER ET AL  2,292,671
AIRPLANE RETRACTABLE LANDING GEAR LOCKING AND SIGNALING MEANS
Filed Oct. 9, 1940  3 Sheets-Sheet 1
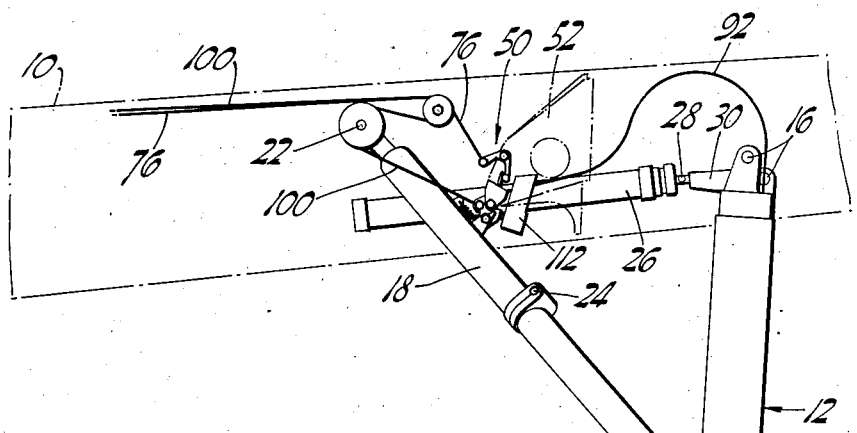
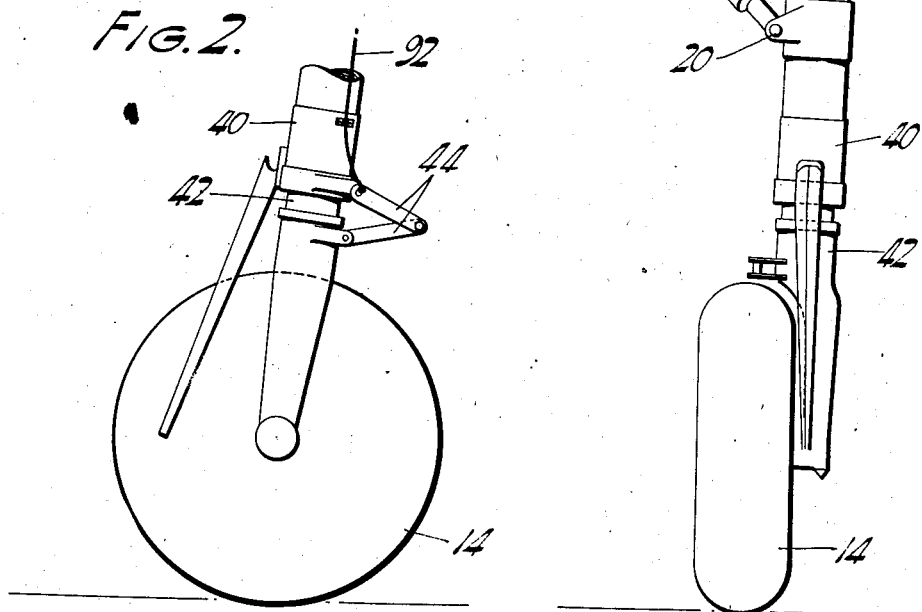
INVENTORS
PAUL A. SUMNER AND
JACK ISREELI
BY
Bean, Brooks, Buckley & Bean
ATTORNEYS

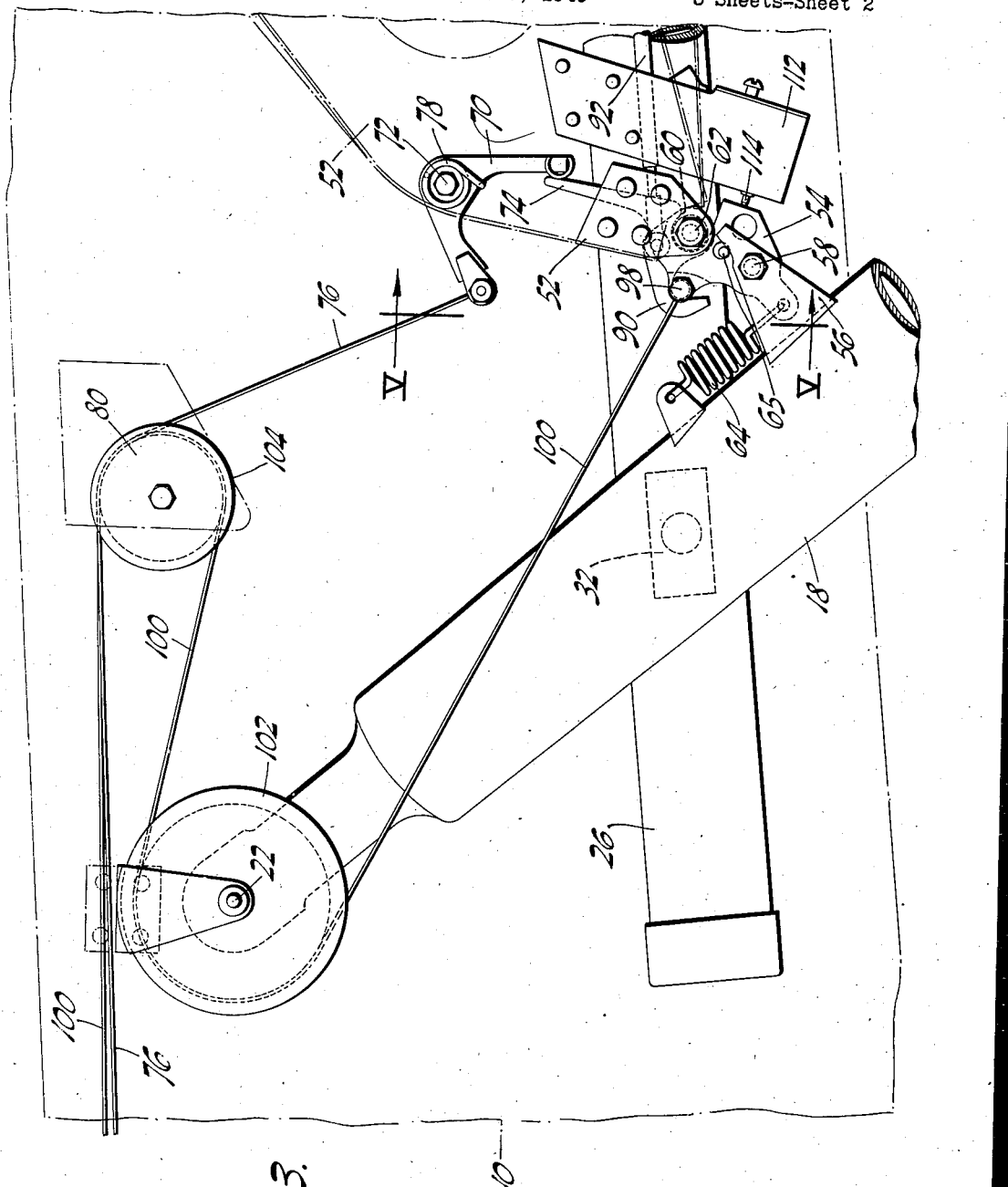

Aug. 11, 1942.  P. A. SUMNER ET AL  2,292,671
AIRPLANE RETRACTABLE LANDING GEAR LOCKING AND SIGNALING MEANS
Filed Oct. 9, 1940  3 Sheets-Sheet 3
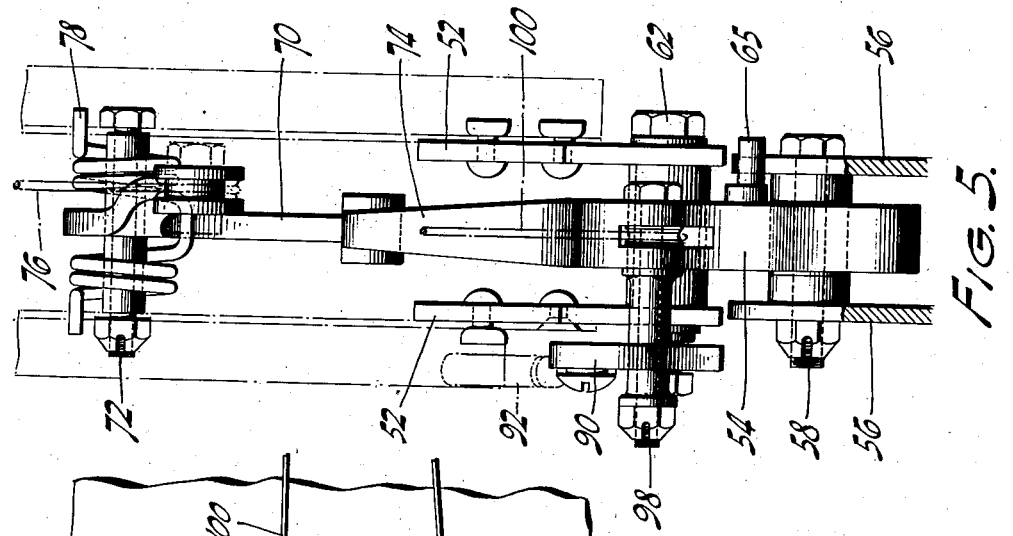
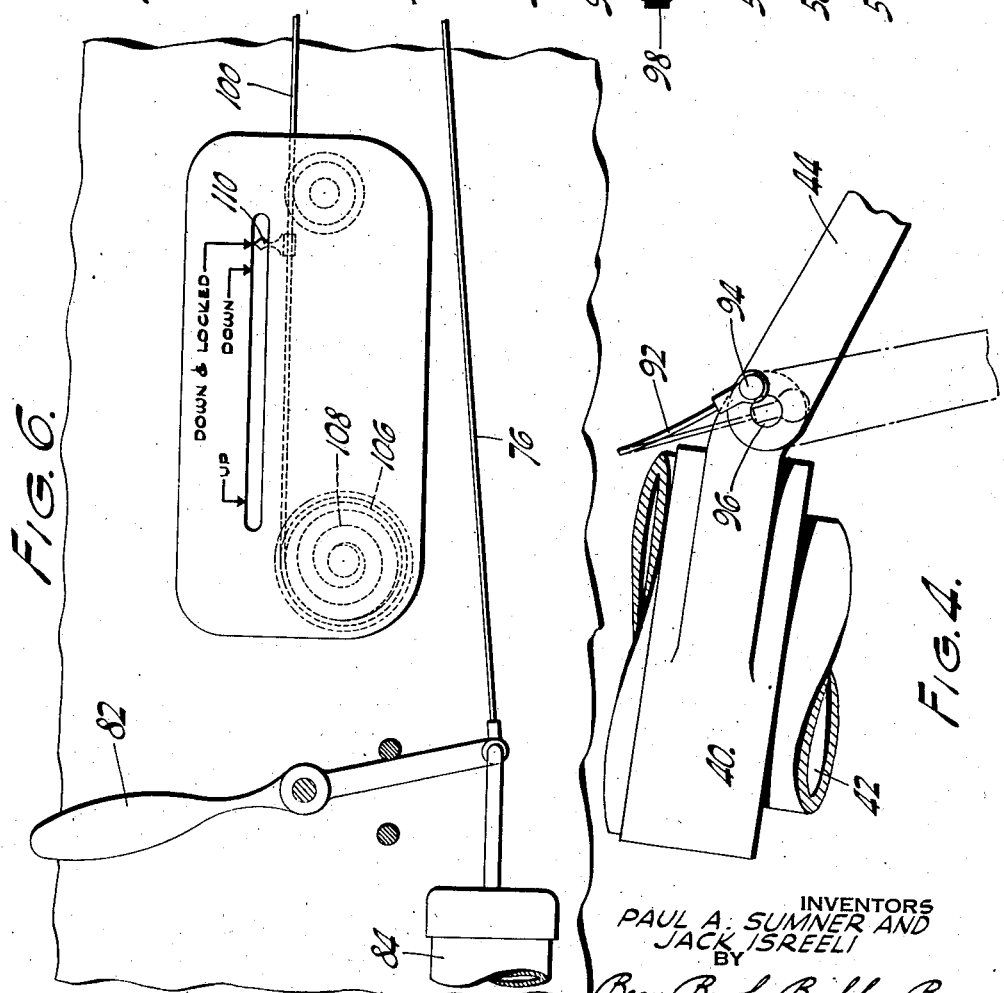
INVENTORS
PAUL A. SUMNER AND
JACK ISREELI
BY
Beau, Brooks, Buckley & Beau.
ATTORNEYS Patented Aug. 11, 1942

2,292,671

UNITED STATES PATENT OFFICE 2,292,671

AIRPLANE RETRACTABLE LANDING GEAR LOCKING AND SIGNALING MEANS

Paul A. Sumner, Long Island, and Jack Isreeli, New York, N. Y., assignors to Brewster Aeronautical Corporation, Long Island City, N. Y.

Application October 9, 1940, Serial No. 360,442

6 Claims. (Cl. 244—102)

This invention relates to airplane retractable landing gear and the like.

One of the objects of the invention is to provide an improved airplane retractable landing gear including locking means and means for signaling the condition of the gear and of the locking means. Other objects and advantages will appear in the specification herein.

In the drawing:

Fig. 1 is a fragmentary front elevation of an airplane landing gear structure of the invention;

Fig. 2 is a fragmentary side elevation of a portion of Fig. 1;

Fig. 3 is an enlarged view of a detail of Fig. 1;

Fig. 4 is a section, on an enlarged scale, taken substantially along line V—V of Fig. 3;

Fig. 5 is a section, on an enlarged scale, taken substantially along line V—V of Fig. 3; and Fig. 6 is a diagrammatic view of remote control and signal devices associated with the mechanism illustrated by the other figures.

The drawings illustrate the invention in connection with an airplane having a wing panel 10 upon which is mounted a landing wheel carrying main strut 12. The strut 12 is illustrated as carrying a landing wheel 14 and as being pivotally mounted at its upper end upon the wing panel 10 by means of pivot pins 16. A folding type strut 18 is pivotally connected by means of a pin 20 to an intermediate portion of the strut 12 and by means of a pin 22 to a fixed portion of the wing panel 10 so as to be adapted to function as a lateral brace for the main strut 12 when the gear is in extended position. The strut 18 is hinged as at 24 so as to be adapted to break away from the pivotal connection 16—16, and a hydraulic jack 26 is operatively connected at one end by means of a pin 28 to a crank arm 30 extending rigidly from the upper end of the main strut 12. The jack 26 is operatively connected at its opposite end by means of a connection device 32 to one of the elements of the folding strut 18 at a point intermediately of the pivotal connections 20—22. Consequently, the hydraulic jack 26 is adapted to be actuated by means of hydraulic pressure so as to extend itself and to bear in opposite directions against the main strut crank arm 30 and against the folding strut 18 in such manner as to break the folding strut about its hinge 24 and to cause the lower end of the main strut 12 to be drawn inboard and upwardly into nesting position within the wing panel 10.

The main strut 12 is of the shock absorbing type and comprises generally telescopic members 40 and 42 which are adapted to move axially relative to one another under airplane landing forces to cushion the effects of such forces, and a pair of articulated links 44 are pivotally connected to the telescopic members 40 and 42 to provide a so-called scissors connection therebetween for maintaining the members in radial alignment. (Figs. 2 and 4.)

A lock device for maintaining the retraction actuating elements of the gear is indicated generally by the numeral 50 in Fig. 1 and shown in detail in Figs. 3 and 5. The lock device 50 is mounted upon a bracket device 52 extending from a stationary portion of the wing panel, and operating elements thereof are arranged in association with the upper element of the folding strut 18 in such manner as to detachably connect it to the bracket 52 for locking the airplane landing gear in its extended position. For this purpose the locking device comprises essentially a latch 54 which is pivotally mounted upon a fixed bracket 56 extending laterally from the folding strut 18; the pivotable mounting of the latch being provided by a pin 58 extending through the latch and the bracket 56. The latch member 54 is recessed at 60 at one side thereof for locking engagement with a pin 62 extending in fixed relation from the bracket 52. A tension spring 64 is connected to the latch 54 so as to at all times urge the latch into locking relation with respect to the pin 62; and a stop pin 65 extends laterally from the latch 54 for engagement with the bracket 56 to limit the movement of the latch 54 in response to the spring forces so that the latch remains in proper attitude for reengagement of the fixed pin 62 whenever the landing gear is retracted. The stop pin 65 is eccentrically mounted upon the latch 54 so as to be rotatable to different positions of adjustment so as to minutely adjust the limit of the spring action as may be required upon final assembly of the mechanism.

A release device for the latch 54 is provided in the form of a crank 70 pivotally mounted upon the bracket 52 by means of a pin 72 and having an end portion in sliding abutting relation with respect to an end portion 74 of the latch 54 for pivoting the latter upon the pin 58 against the action of the spring 64 in such manner as to remove the latch 54 from engagement with the pin 62. A control cable 76 is connected to the crank 70 in such manner as to be adapted to be pulled to move the crank 70 so as to release the latch as described hereinabove. A coil spring 78 is mounted upon the pin 72 so as to at all times resiliently urge the crank away from engagement with the arm 74 of the latch. The control cable 76 is threaded over a pulley 80 mounted upon a fixed portion of the wing panel and is connected at its opposite end to a pilot control lever 82 disposed within convenient reach of the airplane pilot (Fig. 6). The lever 82 is also operatively connected to the hydraulic jack control valve 84 which controls the flow of fluid pressure to the hydraulic jack 26 for actuating the landing gear. The control devices are so arranged that upon pilot manipulation of the control lever 82 from the position illustrated in Fig. 6 toward the right as viewed in the drawing, the control cable 76 will be pulled to move the crank 70 against the latch finger 74 so as to release the latch 54 from engagement with the fixed pin 62. Simultaneously, the movement of the pilot control lever 82 will actuate the valve 84 so as to introduce fluid pressure into the hydraulic jack 26 in such manner as to cause the latter to extend and to bear laterally against the folding strut 18 for retraction of the landing gear as explained hereinabove.

The parts of the mechanism are so arranged that the axis of the pivot 58 is outside, or to the right as viewed in Fig. 3, of a line drawn normal to the radius of rotation of the latching gear about the pivot pin 22 where it intersects the axis of the fixed pin 62. Hence, whenever the landing gear is locked in its extended position, as illustrated in Fig. 3, external forces acting upon the landing gear tending to move the folding strut 18 away from the locking bracket 52 will react to move the latch toward more firmly locked position as distinguished from tending to cam it out of engagement relative to the pin 62.

A safety guard to prevent the pilot from inadvertently unlocking the landing gear and actuating the retraction mechanism whenever the airplane is resting upon the ground is illustrated as comprising a guard hook 90 which is rotatably carried upon the fixed pin 62 and provided with a pull cable 92 of the Bowden wire type leading to connection at its opposite end with the upper of the scissor links 44 at a pivot connection 94 spaced from the adjacent center 96 of pivotal connection of the link to the strut element 40. The parts are so proportioned and relatively arranged that whenever the weight of the airplane is disposed upon the landing gear and the telescopic members 40 and 42 are in relatively retracted position, the cable 92 will be pushed upwardly sufficiently to move the hook 90 to the position thereof illustrated in Fig. 3 wherein it engages a pin 98 extending transversely from the latch member 54. Consequently, when the airplane is resting upon the landing surface the hook 90 will prevent the pilot from releasing the landing gear lock and motivating the hydraulic jack control valve. Upon take-off of the airplane, however, the relative extension of the landing gear telescopic elements 40 and 42 upon release of the weight of the airplane therefrom will open the scissors links 44 in such manner as to pull downwardly upon the cable 92 so as to withdraw the hook 90 from association with the latch pin. Thus, the locking device is then freed to be actuated by the remote control means as the pilot may desire.

A pilot signal device for indicating the condition of the airplane landing gear and the locking device 50 is provided through means of a cable 100 conected at one end to the latch 54 and threaded about a pulley 102 which is carried by the pin 22 defining the pivotal axis of the folding strut element 18. The cable 100 is thence threaded around a pulley 104 which is illustrated as being mounted parallel to the pulley 80 hereinabove described and upon a fixed portion of the airplane wing panel. From the pulley 104 the cable 100 leads forwardly to a visual indicator device located within convenient view of the pilot when seated in the airplane cockpit (Fig. 6); the cable 100 being wrapped about a drum 106 rotatably carried upon a fixed wall portion of the airplane and at all times urged by a coil spring 108 to rotate so as to pull the cable 100 forwardly. By reason of the threading of the cable 100 about the pulley 102, the cable 100 is relaxed from the condition illustrated in the figures and allowed to be pulled forwardly by the coil spring 108 whenever the landing gear strut 18 is moved toward gear retracted position from the position illustrated in Figs. 1 and 3. An indicator finger 110 is fixed to the cable 100 so as to move therewith and to register with scale markings indicated in Fig. 6 to designate the condition of the landing gear mechanism throughout the range of its various adjustments. In this respect particular attention is called to the fact that whenever the landing gear is moving from retracted toward extended position, the cable 100 will move the indicator finger 110 from the dial position marked "up" toward the dial position marked "down," and that as the strut 18 assumes its straightened final gear extended position the finger portion 74 of the latch 54 cams over the fixed pin 62 until the recessed portion 60 of the latch registers with the pin 62, whereupon the latch finally snaps downwardly under the action of the spring 64 into locking engagement with the pin 62 without further corresponding movement of the strut 18, and thereby pulls the cable 100 from the dial position marked "down" to the dial position marked "down and locked." Thus, the dial provides at all times a visible indication of the position of the landing gear and of the condition of the locking device 50.

An additional signal actuating device in the form of a micrometer switch 112 is shown in Fig. 3 as being mounted upon a fixed portion of the airplane wing panel and having an actuating finger 114 extending into registry with the locking latch 54 so as to be adapted to close an electrical circuit to a sound or light signal whenever the latch 54 is withdrawn from locking position with respect to the fixed pin 62. Consequently, an audible or light signal will be thereby activated as the landing gear moves between extended and retracted positions; a similar micrometer switch being preferably provided adjacent the retarded position of the engine throttle for again opening the signal control circuit when the engine speed is above safe flying speed. Thus, an additional safety device is provided for reminding the pilot that the landing gear is not locked in extended position whenever the throttle is retarded below flying speed.

Although only one form of the invention has been shown and described in detail, it will be apparent to those skilled in the art that the invention is not so limited but that various changes may be made therein without departing from the spirit of the invention or the scope of the appended claims.

What is claimed is:

1. In an airplane, a retractable landing gear, a movable member associated with said gear, means for moving said movable member, a latch normally locking said gear to a fixed portion of said airplane when said gear is in extended position, remotely controlled means for releasing said latch, means operatively connecting said latch release means and said movable member moving means in such manner that release of said latch is automatically accompanied by actuation of said movable member so as to procure retraction of said gear, and a hook device arranged to hold said latch against releasing movement with respect to said movable member when said landing gear is extended and in pressure contact with a landing surface, and means associated with said hook device for moving the latter to latch release position whenever said landing gear is relieved of pressure contact relative to a landing surface.

2. In an airplane, a retractable landing gear comprising a main strut of telescoping force absorbing form, a movable member associated with said gear, means for moving said movable member to actuate said gear from extended to retracted positions, a latch normally locking said gear to a fixed portion of said airplane when said gear is in extended position, remotely controlled means for releasing said latch, means operatively connecting said latch control means and said movable member moving means in such manner that release of said latch is automatically accompanied by movement of said movable member so as to procure retraction of said gear, a hook device arranged to hold said latch against releasing movement with respect to said movable member when said landing gear is extended and supporting said airplane upon a landing surface, and means operatively connected with a telescoping portion element of said landing gear main strut and said hook for moving the latter to latch release position whenever said landing gear is relieved of pressure contact relative to a landing surface.

3. In an airplane, a retractable landing gear, a movable member associated with said gear, means for moving said movable member, a latch pivotally mounted upon said movable member and normally locking said gear to a fixed portion of said airplane when said gear is in extended position, remotely controlled means for releasing said latch, means operatively connecting said latch control means and said movable member moving means in such manner that release of said latch is automatically accompanied by movement of said movable member so as to procure retraction of said gear, and means operatively connected to said latch to indicate visually the condition of the landing gear movable member and of said latch at a position remote therefrom.

4. In an airplane, a retractable landing gear having a member movable to actuate said gear between extended and contracted positions, means for moving said movable member, a latch pivotally mounted upon said movable member and normally locking said movable member in connection with a fixed portion of said airplane when said gear is in extended position, remotely controlled means for releasing said latch, a hook device arranged to move so as to engage said latch against releasing movement with respect to said movable member when said landing gear is in fully extended position and supporting said airplane in pressure contact upon a landing surface, means operatively connecting said movable member and said latch to a remotely disposed visual indicator to indicate progressively the position of said movable member between gear extended and gear retracted positions and the condition of said latch, said connection means being adapted to move said indicator in response to latch movements independently of movements of said movable member preparatory to latch hooking movements of said hook.

5. In an airplane, a retractable landing gear comprising a main strut of telescoping force absorbing form, a movable member associated with said gear, means for moving said movable member to actuate said gear between extended and retracted positions, a latch normally locking said gear to a fixed portion of said airplane, remotely controlled means for releasing said latch, means operatively connecting said latch control means and said movable member moving means in such manner that release of said latch is automatically accompanied by movement of said movable member, a hook device arranged to hold said latch against releasing movement with respect to said movable member when said landing gear is extended and supporting said airplane upon a landing surface, and means operatively connected with a telescoping portion element of said landing gear main strut and said hook for moving the latter to latch release position whenever said landing gear is relieved of pressure contact relative to a landing surface, said latch having its force bearing portions so arranged relative to said fixed portion of said airplane as to be normally stable in latched position.

6. In an airplane, a retractable landing gear, a movable member associated with said gear, means for moving said movable member, a latch pivotally mounted upon said movable member and normally locking said gear to a fixed portion of said airplane when said gear is in extended position, remotely controlled means for releasing said latch, a hook device arranged to move so as to engage said latch against releasing movement with respect to said movable member when said landing gear is in fully extended position and supporting said airplane in pressure contact upon a landing surface, means operatively connecting said latch control means and said movable member moving means in such manner that release of said latch is automatically accompanied by actuation of said movable member, means operatively connecting said movable member and said latch to a remotely disposed visual indicator to indicate progressively the position of said movable member between gear extended and gear retracted positions and the condition of said latch at a position remote therefrom, said connection means being adapted to move said indicator in response to latch movements independently of movements of said movable member preparatory to latch hooking movements of said hook, and an audible signal device operatively associated with said latch so as to emit sound producing vibrations whenever said latch is released from locking engagement with said movable member.

PAUL A. SUMNER.
JACK ISREELI.